United States Patent [19]
Nitschke

[11] Patent Number: 6,158,754
[45] Date of Patent: Dec. 12, 2000

[54] WHEEL CARRIER FOR MOTOR VEHICLES

[75] Inventor: Torsten Nitschke, Damme, Germany

[73] Assignee: Lemförder Metallwaren AG, Germany

[21] Appl. No.: 09/156,008

[22] Filed: Sep. 17, 1998

[30] Foreign Application Priority Data

Sep. 20, 1997 [DE] Germany ................ 297 16 917 U

[51] Int. Cl.[7] ................ B62B 7/20; B62B 7/18; F16B 11/00

[52] U.S. Cl. ................ 280/93.511; 280/93.512; 403/23

[58] Field of Search ............ 280/93.511, 93.512; 403/23, 10

[56] References Cited

U.S. PATENT DOCUMENTS

| | | | |
|---|---|---|---|
| 2,657,945 | 11/1953 | Britt | 280/93.511 |
| 3,527,316 | 9/1970 | Jones, Jr. et al. | 280/93.511 |
| 3,938,822 | 2/1976 | Guerriero | 280/93.511 |
| 5,531,534 | 7/1996 | Urbach | 403/23 |
| 5,538,275 | 7/1996 | Lomnick | 280/23 |

*Primary Examiner*—S. Joseph Morano
*Assistant Examiner*—Jason R. Bellinger
*Attorney, Agent, or Firm*—McGlew and Tuttle, P.C.

[57] ABSTRACT

A wheel carrier for motor vehicles with a slotted area. The wheel carrier has two limitedly elastic clamping jaws on a wheel side, which are traversed by a clamping bolt, whose tightening torque determines the strength of a clamping joint. This clamping joint fixes an end piece of a pivot pin of a ball-and-socket joint, especially a guiding joint. This end piece is inserted into the wheel carrier. The joint ball of the pivot pin is mounted in a housing accommodating the joint ball movably in all directions. A clamping protector 5 covering the slotted area 1.1 of the wheel carrier 1 is inserted into the slotted area 1.1 of the wheel carrier 1 and is sealingly fixed in the slotted area, while the material of the clamping protector undergoes plastic deformation in at least some areas.

13 Claims, 3 Drawing Sheets

WHEEL CARRIER FOR MOTOR VEHICLES

FIELD OF THE INVENTION

The present invention pertains to a wheel carrier for motor vehicles with a slotted area, where the wheel carrier has two limitedly elastic clamping jaws on a wheel side. The clamping jaws are traversed by a clamping bolt, whose tightening torque determines the strength of the clamping joint. The clamping joint fixes an end piece of a pivot pin of a ball-and-socket joint, especially a guiding joint. The end piece is inserted into the wheel carrier. A joint ball of the guiding joint is arranged opposite the end piece and is mounted in a housing accommodating the joint ball movably in all directions. The housing is connected to another component of the motor vehicle.

BACKGROUND OF THE INVENTION

Wheel carriers of this type are used especially in motor vehicles with front-wheel drive. The wheel suspension of a driven front wheel also must assume a steering function, besides the wheel-stabilizing function. Among other things, ball joints, which are called support or guiding joints, are used for this purpose, depending on the intended use.

To establish a connection between the wheel carrier and the pivot pin inserted into the wheel carrier, the use of a pivot pin clamping joint has been known from the state of the art.

The wheel carrier has an area that is slotted in some sections, and this area passes over into a mount shaped complementary to the end piece of the pivot pin. The wheel carrier thus has two limitedly elastic clamping jaws on the wheel side. These clamping jaws are traversed by a clamping bolt. The tightening torque of the clamping bolt determines the strength of the clamping joint.

The usually cylindrical end piece of the pivot pin is inserted into the complementary mount in the wheel carrier and is fixed by tightening the clamping bolt.

In addition, other variants or embodiments have been known as well. Thus, the pivot pin of a prior-art guiding joint may be connected to the wheel carrier by clamping, and the transversely seated clamping bolt engages an annular groove of the cylindrical pin at the same time.

The pin can be prevented by these measures from automatically falling out of its mount in the case of the unintended or accidental loosening of the clamping bolt.

The side of the pivot pin located opposite the end piece is equipped with a joint ball, which is mounted in a ball-and-socket joint housing in the known manner. The ball-and-socket joint housing is also connected to another component of the motor vehicle, e.g., a tie rod.

The wheel carrier is exposed to all effects of weather nearly unprotected during driving. It has been found in prior-art designs of wheel carriers that contaminants and moisture penetrate into the slotted area and thus they can reach the pivot pin as a consequence of the exposed clamping joint.

Such contaminants, e.g., water spray, dirt or salts, cause corrosion of the wheel carrier and the pivot pin during the use of a motor vehicle, and this corrosion may lead to an accelerated wear of the entire assembly unit as well as of individual parts of this assembly unit. Thus, increased degradation of the sealing materials may also start as a consequence of the sometimes high corrosiveness of these media.

As a result of this, it was also observed in some cases that moisture was able to penetrate into the ball-and-socket joint and destroy it within a very short time due to the corrosion occurring at the pivot pin.

SUMMARY AND OBJECTS OF THE INVENTION

The primary technical object of the present invention is to develop a wheel carrier with a clamping area receiving the pivot pin and is protected from external effects, especially contaminants or water spray.

This technical object is accomplished according to the present invention with a wheel carrier for motor vehicles with a slotted area, where the wheel carrier has two limitedly elastic clamping jaws on the wheel side. These clamping jaws are traversed by a clamping bolt. The clamping bolt tightening torque determines the strength of the clamping joint. The clamping joint preferably fixes an end piece of a pivot pin of a ball-and-socket joint, especially a guiding joint. The end piece is inserted into the wheel carrier. The joint ball of the guiding joint is arranged opposite the end piece and is mounted in a housing accommodating the joint ball movably in all directions. The housing is also connected to another component of the motor vehicle. A clamping protector covering the slotted area of the wheel carrier is inserted into the slotted area of the wheel carrier and is sealingly fixed in the slotted area with the material of the clamping protector undergoing plastic deformation in at least some areas.

The clamping protector covering the slotted area is inserted into the slotted area of the wheel carrier during the assembly of the wheel carrier assembly unit. This clamping protector is fixed in the slotted area during the tightening of the clamping joint. Plastic deformation of the protector in at least some areas additionally supports its sealing function.

Vehicles which were not equipped with such means before, can also be retrofitted with clamping protectors, and is a particularly advantageous solution according to the present invention. The clamping protector can be subsequently attached in these vehicles by simply loosening the clamping bolts.

A clamping protector according to the present invention is correspondingly defined as a simple cover of the slotted area in the wheel carrier, which protects this highly sensitive area from the penetration of water spray, chemicals or contaminants.

Thus, a wheel carrier according to the present invention may be equipped with a clamping protector, which preferably has a cap-like shape. Under a regular jacket area, this clamping protector has a wall. The material thickness of the wall should approximately correspond to the width of the slotted area of the wheel carrier in the untensioned state. Such a design guarantees that the clamping protector will be plastically deformed during the tensioning of the wheel carrier. It is especially advantageous to provide an elongated hole-like opening in the wall in the area of the wall. The clamping protector can thus also be used in the above-described manner to retrofit vehicles which had not yet been equipped with such a means according to the present invention.

It is especially advantageous to manufacture a clamping protector as a one-piece plastic molding.

To improve the sealing function of the clamping protector, it may also be advantageous to provide the clamping protector with areas of different material hardness (Shore hardness). The different material hardnesses within the clamping protector of a predominantly one-piece design might be achieved, e.g., by a tempering performed in some areas after the manufacture of the clamping protector.

It is, of course, also possible to design a clamping protector of the design according to the present invention as a multi-piece clamping protector.

The area of the wall of the clamping protector should be made, in particular, softer compared with the jacket surface. The jacket surface is exposed to a great variety of mechanical or chemical stresses during driving and it should therefore have a sufficient strength, which should be higher than that of the wall.

A preferred embodiment of a wheel carrier according to the present invention will be described in greater detail below on the basis of the drawing.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
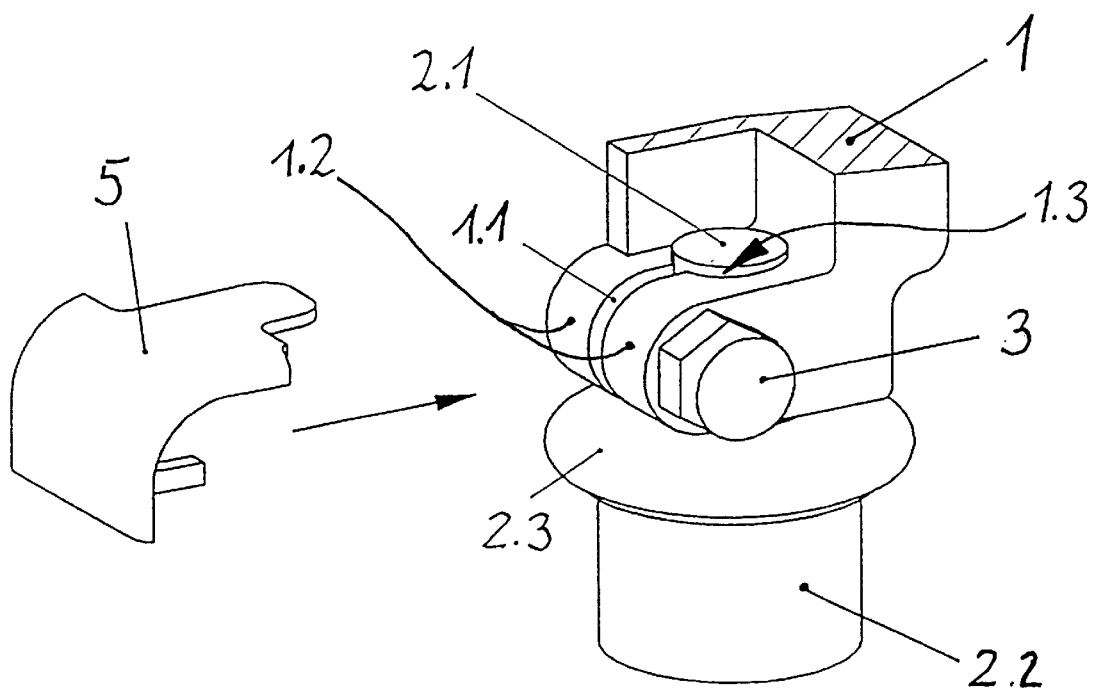
FIG. 1 is an exploded view of a detail of a wheel carrier according to the present invention.
Figure 2:
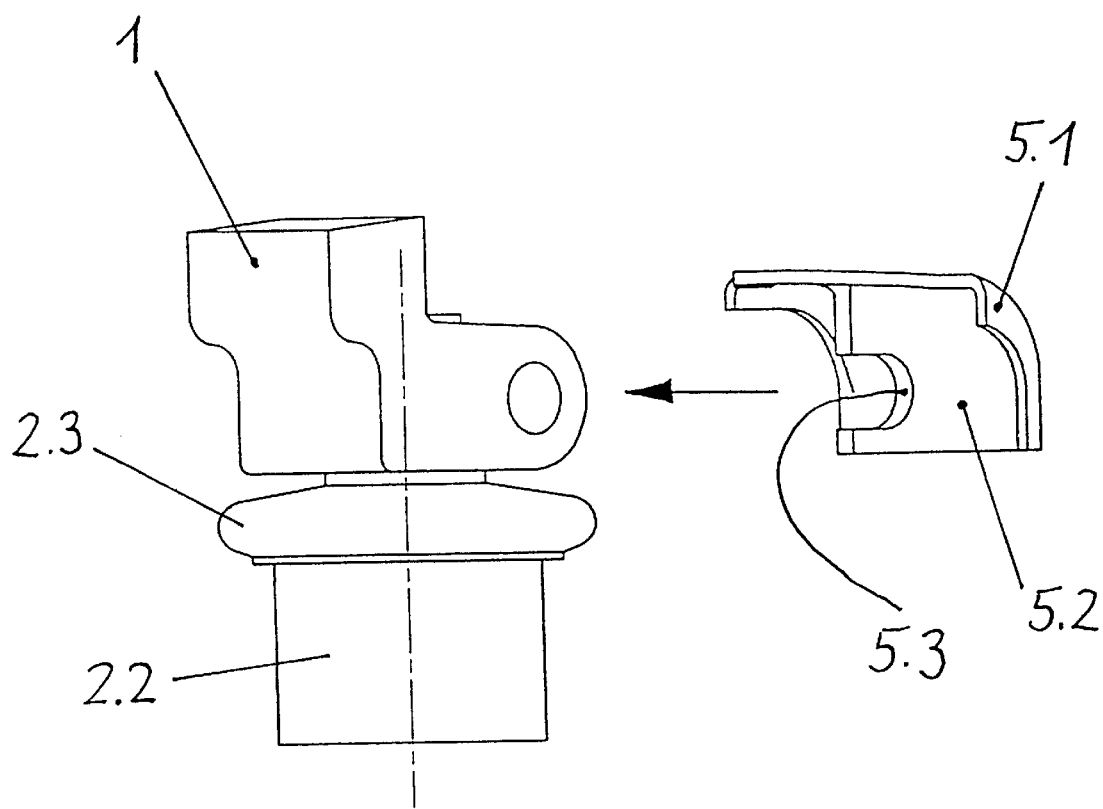
FIG. 2 is a representation of an exploded view of a detail of a wheel carrier according to the present invention, which is rotated by 180° compared with FIG. 1.
Figure 3:
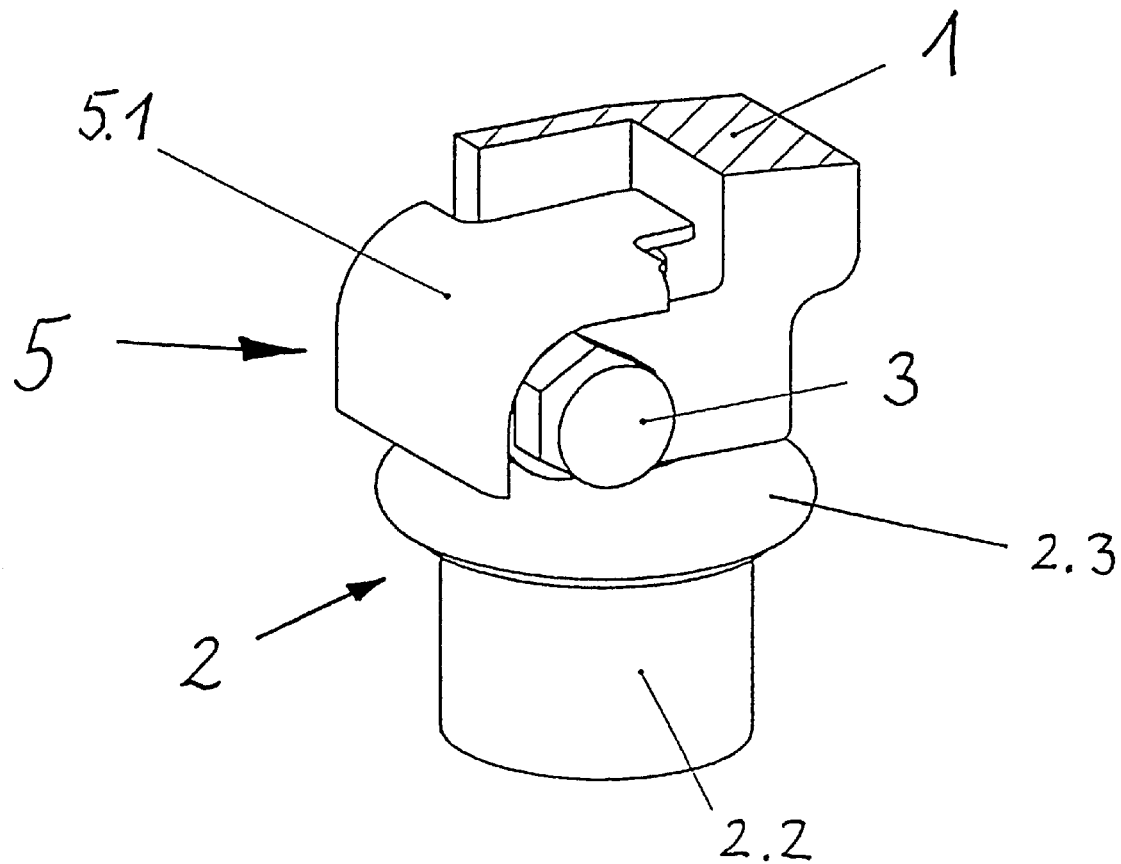
FIG. 3 is a detail of the assembly of a wheel carrier according to the present invention.

Referring to the drawings in particular, FIGS. 1 and 2 show an exploded view of a detail of a wheel carrier 1 according to the present invention, while FIG. 3 shows a detail of the wheel carrier as an assembly.

A pivot pin 2.1 of a ball-and-socket joint 2 is inserted with its predominantly cylindrical end piece into a mount 1.3 with a complementary shape in the wheel carrier 1. The mounting area 1.3 for the pivot pin 2.1 passes over on the wheel side into a slotted area 1.1 in the wheel carrier 1. This mounting area 1.3 is larger in the untensioned state than the diameter of the pivot pin 2.1. This allows the pivot pin 2.1 to be inserted with ease into the mounting area 1.3 in the manner of a clearance fit. The ball-and-socket joint 2 shown is a guiding joint and is pushed into the wheel carrier 1 from below. The slotted area 1.1 of the wheel carrier 1 is traversed by a clamping bolt 3. The slotted area 1.1 comprises, as can be seen especially from the representation in FIG. 1, two clamping jaw parts, 1.2. One of the clamping jaw parts 1.2 has a through hole, and the other of the clamping jaw parts 1.2 has a threaded area. The clamping jaw parts 1.2 are pulled together during the tightening of the clamping bolt 3 and thus they fix the pivot pin 2.1 in the mount 1.3 of the wheel carrier 1. Under the wheel carrier 1, the ball-and-socket joint has a sealing element (known in itself), in this case a sealing bellows 2.3. The housing 2.2 of the ball-and-socket joint 2 is shown in FIG. 1 under the sealing bellows 2.3. This housing is inserted into another component of the motor vehicle, which is not shown in the drawing for the sake of greater clarity. The clamping jaws 1.2 are wide open in the untensioned state, so that the clamping protector 5 can be pushed between the clamping jaws. As can be seen, especially in FIG. 2, the clamping protector has a wall 5.2. An opening 5.3 is provided in the front area of the wall 5.2. This opening 5.3 is shaped approximately as an elongated hole open with one side being opened.

The jacket area 5.1 of the clamping protector 5 has a cap-like shape. The wall 5.2 is inserted between the clamping jaws 1.2, i.e., into the slotted area 1.1 of the wheel carrier 1, and the elongated hole-like opening 5.3 surrounds the clamping bolt 3. The wall area 5.2 of the clamping protector 5 is made softer according to the present invention than the jacket area 5.1. The wall area 5.2 of the clamping protector 5 consequently undergoes plastic deformation between the clamping jaws 1.2 during the tightening of the clamping bolt 3.

The embodiment of the clamping protector 5 shown in the figures is manufactured as a one-piece plastic molding according to the injection molding method and it can thus be provided with a Shore hardness that readily permits a plastic deformation, without any effect on the strength of the clamping joint between the wheel carrier and the pivot pin.

A detail of an assembly of a wheel carrier unit according to the present invention is once again shown in FIG. 3. This figure shows that the jacket area 5.1 of the clamping protector is completely adapted to the contour of the wheel carrier 1 in the area of the pivot pin, so that this entire area is covered and is protected from contamination and other disturbing effects.

For example, water spray and contaminants are kept effectively away from the sensitive parts of the ball-and-socket joint.

While a specific embodiment of the invention has been shown and described in detail to illustrate the application of the principles of the invention, it will be understood that the invention may be embodied otherwise without departing from such principles.

APPENDIX

List of Reference Numbers

1 Wheel carrier
1.1 Slotted area
1.2 Clamping jaw
1.3 Mount
2 Ball-and-socket joint
2.1 Pivot pin
2.2 Housing
2.3 Sealing bellows
3 Clamping bolt
4 Motor vehicle component
5 Clamping protector
5.1 Jacket area
5.2 Wall
5.3 Opening

What is claimed is:

1. A wheel joint assembly for a motor vehicle, comprising:

a wheel carrier having a wheel side and a non-wheel side, said wheel carrier including a clamping jaw portion with two limitedly elastic clamping jaws on said wheel side providing a slotted area;

a clamping bolt traversing the clamping jaws, a tightening torque of said clamping bolt determining a strength of a clamping joint including said clamping jaws and said clamping bolt;

a ball-and-socket joint with a pivot pin inserted into said wheel carrier, said pivot pin having an end piece and a joint ball, said clamping joint fixing said end piece of said pivot pin of said ball-and-socket joint inserted into the wheel carrier, said joint ball being arranged opposite the end piece and mounted in a housing accommodating the joint ball movably in all directions, and said housing being connected to another component of the motor vehicle;

a clamping protector covering said slotted area of said wheel carrier, said clamping protector being inserted into said slotted area of said wheel carrier and being sealingly fixed in said slotted area with material of said clamping protector undergoing plastic deformation in at least some areas.

2. The wheel joint assembly in accordance with claim 1, wherein said clamping protector has a cap-like shape and includes a wall which corresponds to an untensioned slot width when no torque is applied to said clamping bolt, said clamping protector being made in one piece and having an elongated hole-like opening recess receiving said camping bolt under a jacket area.

3. The wheel joint assembly in accordance with claim 1, wherein said clamping protector is a plastic molding.

4. The wheel joint assembly in accordance with claim 1, wherein said clamping protector has areas of different material hardness.

5. A wheel joint assembly for a motor vehicle, comprising:
   a wheel carrier having a wheel side and a non-wheel side, said wheel carrier including a clamping jaw portion with two elastic clamping jaws on the wheel side providing a slotted area;
   a clamping bolt traversing the clamping jaws, a tightening torque of said clamping bolt determining a strength of a clamping joint including said clamping jaws and said clamping bolt;
   a ball-and-socket joint with a pivot pin inserted into said wheel carrier, said pivot pin having an end piece and a joint ball, said clamping joint fixing said end piece of said pivot pin, said joint ball being arranged opposite the end piece and mounted in a housing accommodating the joint ball movable in a plurality of directions, and said housing being connectable to another component of the motor vehicle;
   a clamping protector covering said slotted area of said wheel carrier, said clamping protector being inserted into said slotted area of said wheel carrier and being sealingly fixed in said slotted area with material of said clamping protector undergoing plastic deformation.

6. The wheel joint assembly in accordance with claim 5, wherein said clamping protector has a cap-like shape and includes a wall which corresponds to the untensioned slot width when no torque is applied to said clamping bolt, said clamping protector being made in one piece and having an elongated hole-like opening recess receiving said camping bolt under a jacket area.

7. The wheel joint assembly in accordance with claim 5, wherein said clamping protector is a plastic molding.

8. The wheel joint assembly in accordance with claim 5, wherein said clamping protector has areas of different material hardness.

9. A wheel assembly for vehicles, the assembly comprising:
   a wheel carrier having a wheel side and a non-wheel side, said wheel carrier including a clamping jaw portion with two elastic clamping jaws on said wheel side defining a slotted area;
   a clamping bolt traversing the clamping jaws, a tightening torque of said clamping bolt determining a strength of a clamping joint including said clamping jaws and said clamping bolt;
   a ball-and-socket joint with a pivot pin inserted into the wheel carrier, said pivot pin having an end piece, said clamping joint fixing said end piece, said pivot pin including a joint ball arranged opposite said end piece, said joint ball being mounted in a housing accommodating said joint ball movable in a plurality of directions;
   a clamping protector covering said slotted area of said wheel carrier, said clamping protector being inserted into said slotted area of said wheel carrier and being sealingly fixed in said slotted area with material of said clamping protector undergoing plastic deformation.

10. The wheel assembly in accordance with claim 9, wherein:
    said clamping protector has a cap-like shape and includes a jacket area and a wall which corresponds to an untensioned slot width when said clamping jaws are untensioned, said clamping protector being made in one piece with said wall, said wall having an elongated recess receiving said camping bolt under said jacket area.

11. The wheel joint assembly in accordance with claim 9, wherein said clamping protector is a plastic molded part.

12. The wheel joint assembly in accordance with claim 9, wherein said clamping protector has areas of different material hardness.

13. The wheel assembly in accordance with claim 9, wherein:
    said clamping protector has a cap-like shape and includes a wall inserted into said slotted area and having a thickness for being plastically deformed when said clamping joint fixes said end piece.

* * * * *